United States Patent [19]
D'Aleo et al.

[11] Patent Number: 5,196,782
[45] Date of Patent: Mar. 23, 1993

[54] TOUCH-OPERATED POWER CONTROL

[75] Inventors: Michael J. D'Aleo, Erwinna; Richard J. Kwiatkowski, Allentown; Michael J. Rowen, Center Valley, all of Pa.

[73] Assignee: Lutron Electronics Co., Inc., Coopersburg, Pa.

[21] Appl. No.: 772,627

[22] Filed: Oct. 4, 1991

Related U.S. Application Data

[63] Continuation of Ser. No. 372,575, Jun. 28, 1989, abandoned.

[51] Int. Cl.⁵ .............................................. G05F 5/02
[52] U.S. Cl. ................................... 323/320; 323/299; 323/904; 323/905; 315/194; 315/291; 315/DIG. 7; 307/116
[58] Field of Search ............... 323/299, 300, 320, 904, 323/905; 315/194, 223, 291, DIG. 4, DIG. 7; 307/116; D13/32

[56] References Cited

U.S. PATENT DOCUMENTS

| | | | |
|---|---|---|---|
| 3,747,923 | 7/1973 | Spira et al. | 315/291 |
| 3,895,288 | 7/1975 | Lampen et al. | 323/94 R |
| 3,916,327 | 10/1975 | Lampen et al. | 328/147 |
| 3,968,467 | 7/1976 | Lampen et al. | 338/119 |
| 4,119,864 | 10/1978 | Petrizio | 307/116 |
| 4,246,494 | 1/1981 | Foreman et al. | 315/194 X |
| 4,444,998 | 4/1984 | House | 178/19 |
| 4,494,105 | 1/1985 | House | 338/114 |
| 4,672,229 | 6/1987 | Skarman et al. | 307/116 X |
| 4,689,547 | 8/1987 | Rowen et al. | 323/239 |

OTHER PUBLICATIONS

Advanced Technology Dynasty 2000 Touch Dimmer Display Packaging-Model TI-101.
Home Automation Limited Brochure.
Xicor Brochure-May 1987.
Spectra Symbol Data Sheet-Membrane Switch and Panel Co., Inc. Brochure.

Primary Examiner—Emanuel T. Voeltz
Attorney, Agent, or Firm—Seidel, Gonda, Lavorgna & Monaco

[57] ABSTRACT

A system to control power from a source to a load consists of a cover plate, a touch-operable device that is mounted behind a flexible area on the cover plate, and a power control circuit that responds in accordance with a signal generated by the touch-operable device. The system is operated by touching a point within the flexible area of the cover plate to activate the device. In a preferred embodiment, the system provides power over a continuous range of values, depending on the particular point at which the device is activated. Alternatively, the system operates as a switch, alternately turning power on or off when any point on the flexible area is touched. The control circuit preferably includes an electronically adjustable voltage divider. The system is well-adapted to permit control of power to a load from multiple locations. The appearance of the front surface of the cover plate can be dictated entirely by aesthetic considerations and can, if desired, be entirely featureless.

34 Claims, 6 Drawing Sheets 5,196,782

TOUCH-OPERATED POWER CONTROL

This is a continuation of copending application(s) Ser. No. 07/372,575 filed on Jun. 28, 1989 now abandoned

BACKGROUND OF THE INVENTION

1. Field of the Invention

This invention relates to a touch-operable power control system.

2. Description of the Related Art

Dimming or lighting loads is desirable to conserve energy, increase lamp life, and aesthetically improve the human environment. Well known circuit methods, such as phase control, are widely used to vary the power delivered from an AC source to a lighting load.

Some dimming circuits, such as that disclosed in U.S. Pat. No. 3,746,923, issued Jul. 17, 1973, to Spira et al. (Spira et al.), incorporated herein by reference, are adapted to fit in a standard electrical wallbox of the type used to house conventional toggle light switches. Other circuits, generally for controlling larger amounts of power, require cabinets that can be installed in an electrical closet or basement. In either case, a dimmer actuator is manipulated to adjust the brightness of the lighting load. Some dimming circuits are controllable by a number of remotely located actuators, each actuator operable to "take command" (of the dimming circuit) from the other actuators. (See, for example, U.S. Pat. No. 4,689,547, issued Aug. 25, 1987, to Rowen et al.)

Many types of actuators are used to operate dimming circuits. The earliest actuators were rotary. Rotary actuators generally include a round knob that can be rotated about a central axis. A rotary potentiometer mounted behind the knob is operated thereby to provide a signal, such as variable voltage or resistance, to control the power provided by the dimming circuit to the load. One drawback of rotary actuators is that one cannot easily tell the light level (of a lighting load in an adjacent room, for example) from the orientation of the knob. A cover plate generally fits between the knob and the potentiometer to protect the potentiometer from dust and dirt to provide an aesthetically pleasing appearance. As used in this specification and the appended claims, a cover plate is understood to have a front and back surface. The front surface is generally prominent and aesthetically pleasing. The back surface is generally hidden from view.

Linear slide actuators of the type disclosed in Spira et al. have gained widespread acceptance in the dimming industry. They generally include a slider that moves linearly along a predetermined path. A linear potentiometer mounted behind the slider is operated thereby to provide a variable voltage or resistance to the dimming circuit. Generally, linear slide dimmers permit lighting levels to be determined easily from the slider position.

A more recent development has been the "Touch-actuated dimmer." A touch dimmer generally includes a touch- or pressure-operated device which controls a conventional dimming circuit. Since these devices are typically small and thin, they permit touch dimmers to be flat, compact, and less conspicuous than mechanically operated dimmers. The rugged construction of touch-operated devices makes these dimmers durable and reliable.

One type of touch dimmer, manufactured by Home Automation, has a conductive cover plate which is electrically connected to a control circuit. Touching a finger or the like to the conductive plate increases its electrical capacitance, which is detected by the control circuit. The control circuit provides signals to a dimming circuit for controlling power to a load. The system operates as follows: When a finger is held in contact with the plate, the brightness of a lighting load cycles through a range of selectable light levels. Removing the finger stops the cycle at a particular light level, which is maintained thereafter. Momentarily touching the conductive plate alternately turns the lighting load off and on to the most recently set lighting level. A drawback of this type of touch dimmer is that adjusting the lights requires cycling through a range of light levels before arriving at the desired level. Furthermore, since there is a delay in the eye's response to changing light levels, it may be difficult to stop the cycle at a light level that will be appropriate once the eye has adjusted.

The Touch-A-Level ® lamp dimmer, manufactured by Westek, San Diego, Calif., can be plugged into a wall outlet to control up to 200 W of power from an electrical outlet to a table-top lamp. It is touch-operated to instantly select, from a range of levels, the power delivered to the lamp. The dimmer includes an elongated flexible strip of plastic, containing a number of electrical contacts along its length, adhered to the front surface of a plastic cover plate. Touching the flexible strip at any point along its length causes one or more contacts to close, providing a signal that corresponds to a particular light level. The contacts are arranged to provide a discreet range of approximately 25 selectable light levels. Two drawbacks of the Westek dimmer are that it does not provide a continuous range of selectable light levels and that the flexible strip adhered to the cover plate may peel off with extended use.

SUMMARY OF THE INVENTION

The present invention provides a wallbox mountable power control that has a touch-operated device mounted behind a flexible area of a removable cover plate. A control circuit is adapted to receive signals—preferably momentary voltages—from the touch-operated device to control a conventional dimming circuit. As used in this specification and the appended claims, a signal is understood to be any measurable quantity, electrical or otherwise, by which information is transmitted from one point to another. The touch-operated device is preferably a thin membrane supported against the back surface of the cover plate. Electrical connections to the device are terminated in a connecting socket, which receives a plug for electrically connecting the device to the dimming circuit. The plug and socket are disconnectable to allow removal of the cover plate.

A control circuit of the present invention controls a conventional dimming circuit in response to momentary voltage signals provided by a touch-operated device. The circuit includes an electronically adjustable voltage divider (EAVD), which provides a continuous voltage selectable from a range of voltages, and a comparator, which adjusts the EAVD to provide a continuous voltage that corresponds to the momentary voltage. The continuous voltage is provided to the dimming circuit to control power to a load. In this specification and the appended claims, a load is understood to be any device that uses electrical power. A load may be a light source, such as an incandescent or gas discharge lamp, or it may be a motor, etc.

The present invention also provides a non-volatile memory for storing power levels. After a power interruption, the memory restores power to a level set before the interruption. Alternatively, power may be restored to either a present level or off, depending on whether the load was on or off, respectively, before the interruption.

A plurality of controls of the type described above can be dispersed throughout an area to provide control of a conventional dimming circuit from multiple locations. In this case, each touch-operated device is operable to provide a momentary voltage signal that corresponds to a desired light level. The characteristics of the circuit are such that the power level corresponds to the signal provided by the most recently operated device.

In one embodiment of the present invention, a system for controlling power from a source to a load comprises, in combination:
a) a cover plate that has a front surface, an area of which is flexible,
b) touch-operable means behind said flexible area to provide a signal in response to pressure applied to said flexible area, and
c) circuit means to determine the power provided from said source to said load in accordance with said signal.

In another embodiment of the present invention, a system for controlling power from a source to a load comprises, in combination:
a) touch-operable voltage dividing means to provide a momentary voltage selectable from a range of voltages,
b) electronically adjustable voltage dividing means to provide a continuous voltage selectable from a range of voltages,
c) means to compare said momentary and continuous voltages and to adjust said electronically adjustable voltage dividing means to provide a predetermined relationship between said voltages, and
d) circuit means to control the power provided from said source to said load in accordance with said continuous voltage.

In another embodiment of the present invention, a multi-location system for controlling power from a source to a load comprises, in combination:
a) a plurality of touch operable means positionable at a plurality of locations, each of said means operable to provide a momentary voltage selectable from a range of voltages,
b) means for storing information representative of said momentary voltage and for providing a corresponding continuous voltage,
c) circuit means to determine the power from said source to said load in accordance with said continuous voltage.

In another embodiment of the present invention, a system for controlling power from a source to a load comprises, in combination:
a) touch-operable means to provide a signal in response to an applied pressure,
b) means, requiring no power, for storing information representative of said signal, and
c) circuit means to determine the power provided from said source to said load in accordance with said signal.

DETAILED DESCRIPTION OF THE PRESENT INVENTION

As used in this specification and the appended claims, a touch-operable device includes any device operable to produce a signal in response to an applied pressure (by a finger, for example). Such a device may be a capacitive touch plate, load cell, pressure sensor, or, preferably, a touch-operated membrane device, such as a switch or voltage divider.

Figure 1:
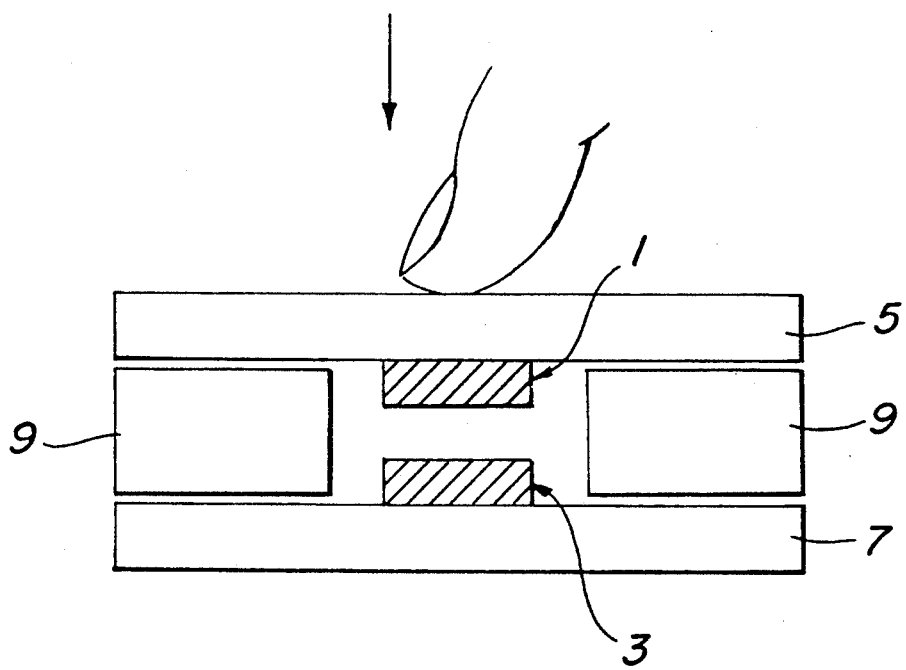
FIG. 1 is a cross-sectional view of a membrane switch of the prior art.

FIG. 1 is a cross-sectional view of a touch-operated membrane switch of the prior art. The switch consists of two conductors 1 and 3 supported by flexible insulating substrates 5 and 7, respectively, which are adhered to and separated by spacer 9. When pressure is applied to the membrane switch (by a finger or the like), substrates 5 and 7 flex and conductors 1 and 3 make contact. When pressure is removed from the membrane switch the substrates resume their original shape and conductors 1 and 3 separate.

Figure 2:
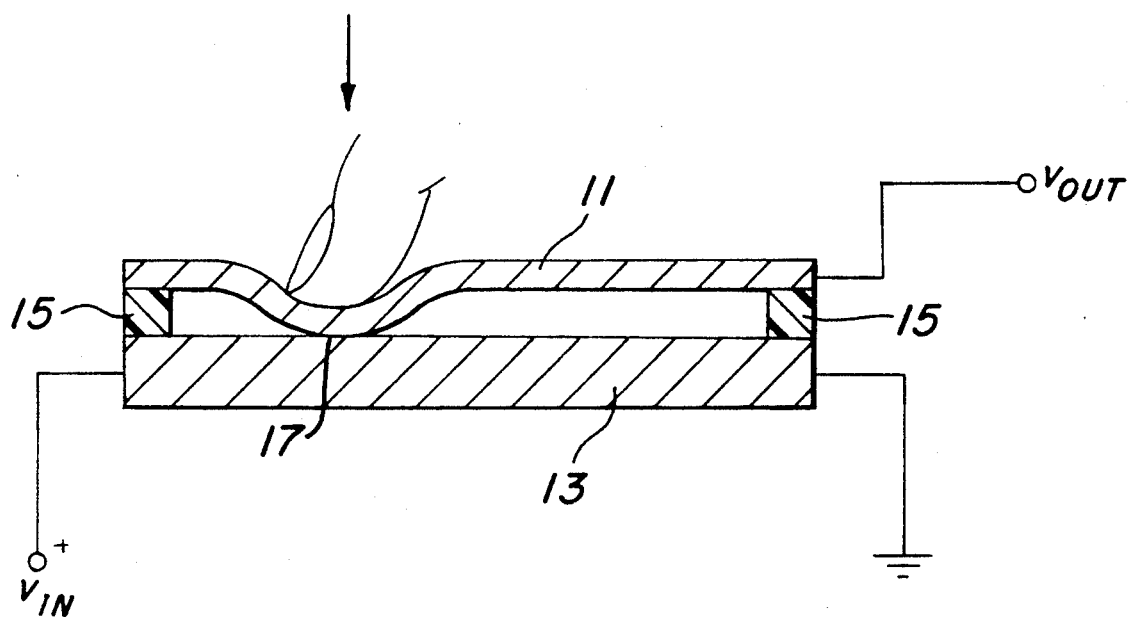
FIG. 2 is a cross-sectional view of a membrane voltage divider of the prior art.

FIG. 2 is a cross-sectional view of a membrane voltage divider of the type disclosed in U.S. Pat. No. 3,968,467, issued Jul. 6, 1976, to Lampen et al., incorporated herein by reference. Conductive element 11 and resistive element 13 are co-extensively supported in close proximity by spacing frame 15. A voltage, $V_{in}$, is applied across resistive element 13 to provide a voltage gradient across its surface. Pressure applied at a point along conductive element 11 causes it to flex downward and electrically contact a corresponding point along the surface of resistive element 13, providing a voltage, $V_{out}$, whose value is between $V_{in}$ and ground. When pressure is released, conductive element 11 recovers its original shape and becomes electrically isolated from resistive element 13. For the purpose of this specification and the appended claims, "conductive" and "resistive" are relative terms as applied to electrical elements. Thus, the essential feature of resistive element 13 is electrical resistance and the essential feature of conductive element 11 is electrical conductance.

Figure 3:
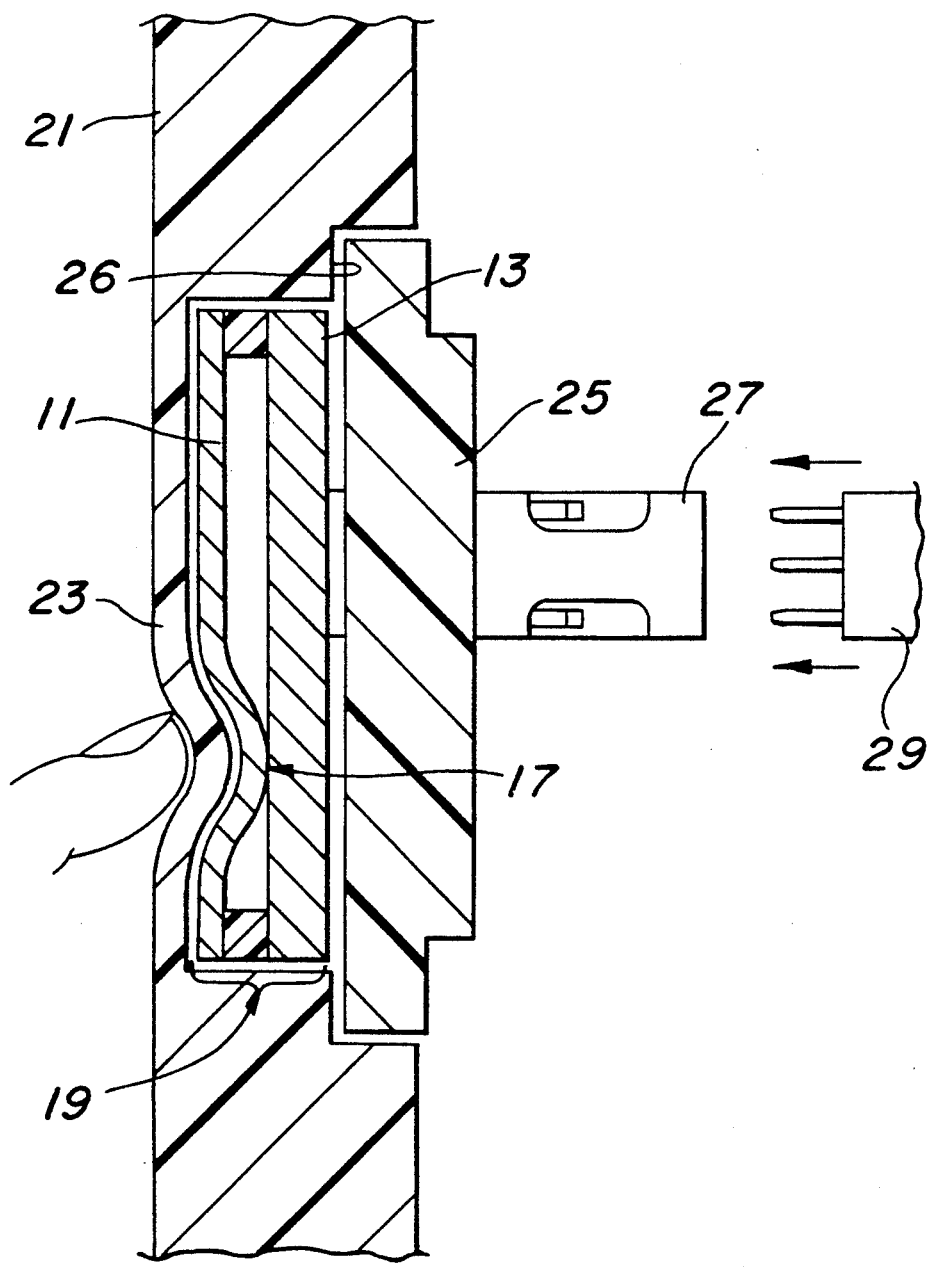
FIG. 3 is a cross-sectional view of a touch-operated control of the present invention.

FIG. 3 is a cross-sectional view of a touch-operated control of the present invention. Touch-operable device 19 is preferably, as shown, a membrane voltage divider of the type shown in FIG. 2. Alternatively, a membrane switch of the type shown in FIG. 1 or any other touch-operable device may be substituted for voltage divider 19. Cover plate 21 is preferably a wall-mountable cover plate of the type described in U.S. Pat. No. 4,803,380, issued Feb. 7, 1989, to Jacoby, Jr., et al. Alternatively, it may be a cover plate for a hand-held wireless remote control or any other suitable cover plate. The front surface of cover plate 21 is preferably planar and smooth; however, its design may be broadly guided by aesthetic considerations. Cover plate 21 is preferably molded of ABS plastic and includes a flexible area 23, the front surface of which is preferably continuous with the remaining front surface of cover plate 21. Flexible area 23 is preferably a web of material that is between about 0.2 mm and 0.5 mm thick and includes fillets along its periphery for reducing stress. Behind flexible area 23 is a pocket within which voltage divider 19 fits. Support plate 25 provides a rigid back for the pocket, and preferably provides a water-tight seal against shoulder 26. Socket 27 is electrically connected to elements 11 and 13 and mates with plug 29 for electrically connecting membrane voltage divider 19 to a conventional phase-control dimming circuit (not shown). Pressure applied to the front surface of flexible area 23 causes conductive element 11 to contact resistive element 13 at a selectable point 17 along its length. A corresponding momentary voltage, selectable from a continuous range, is provided to the dimming circuit, which controls power to a load accordingly.

Alternatively, if a membrane switch is substituted for membrane voltage divider 19, power to the load is alternately turned off and on to a predetermined level in response to pressure applied to the front surface of flexible area 23.

Figure 4:
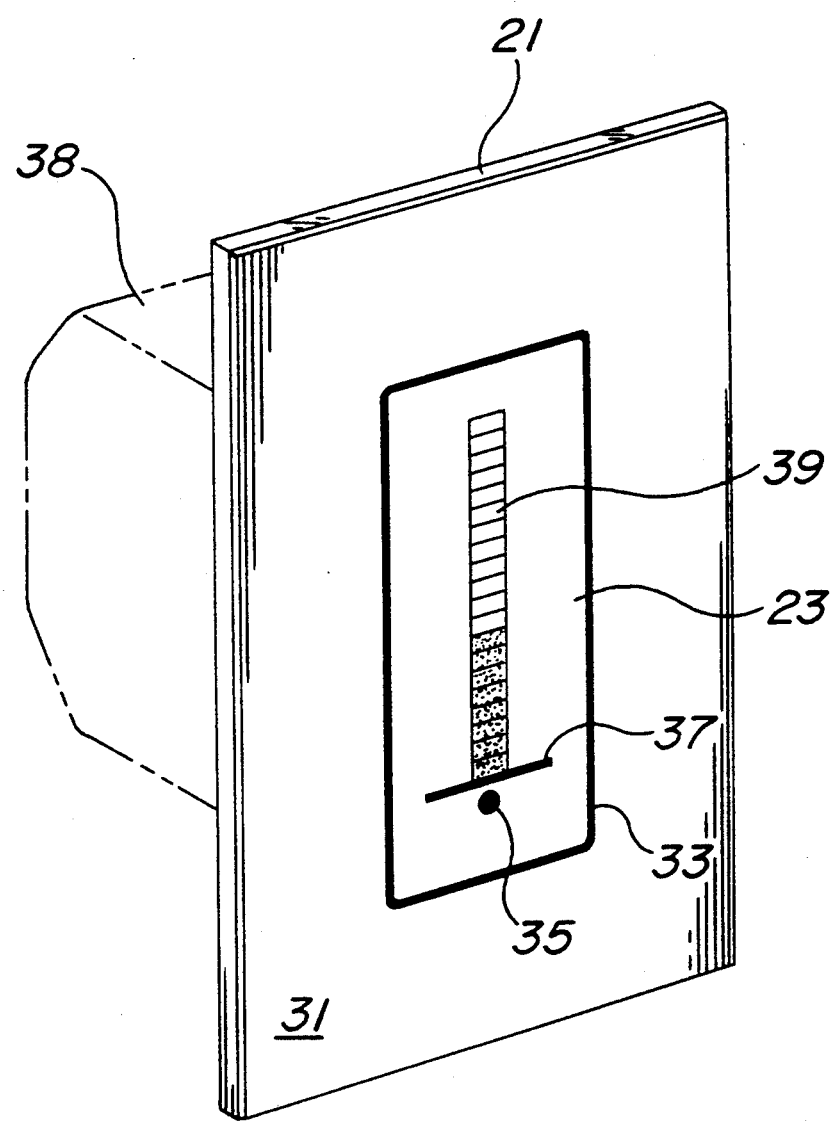
FIG. 4 is an isometric view of a touch-operated control of the present invention.

FIG. 4 is an isometric view of a touch-operated control of the present invention. Front surface 31 of cover plate 21 may be entirely featureless or, guided by considerations of aesthetics or convenience, may include optional markings, such as 33, 35, and 37. These markings indicate, respectively, the location of flexible area 23, location of "power off" and lowest selectable power level. A conventional phase-control dimming circuit within circuit housing 38 controls power from a source to a load in accordance with pressure applied to a selectable point on flexible area 23.

Optional LED array 39 provides a visual indication of power levels. U.S. Pat. No. 3,968,467, reference previously, discloses a circuit for operating an LED array wherein the number of LEDs consecutively illuminated from one end corresponds to the voltage output of a membrane voltage divider. When the load is a light source, there is preferably a linear relationship between the number of illuminated LEDs and the corresponding perceived light level. Flexible area 23 may optionally include a light transmissive area through which LED array 39 is visible.

Figure 5:
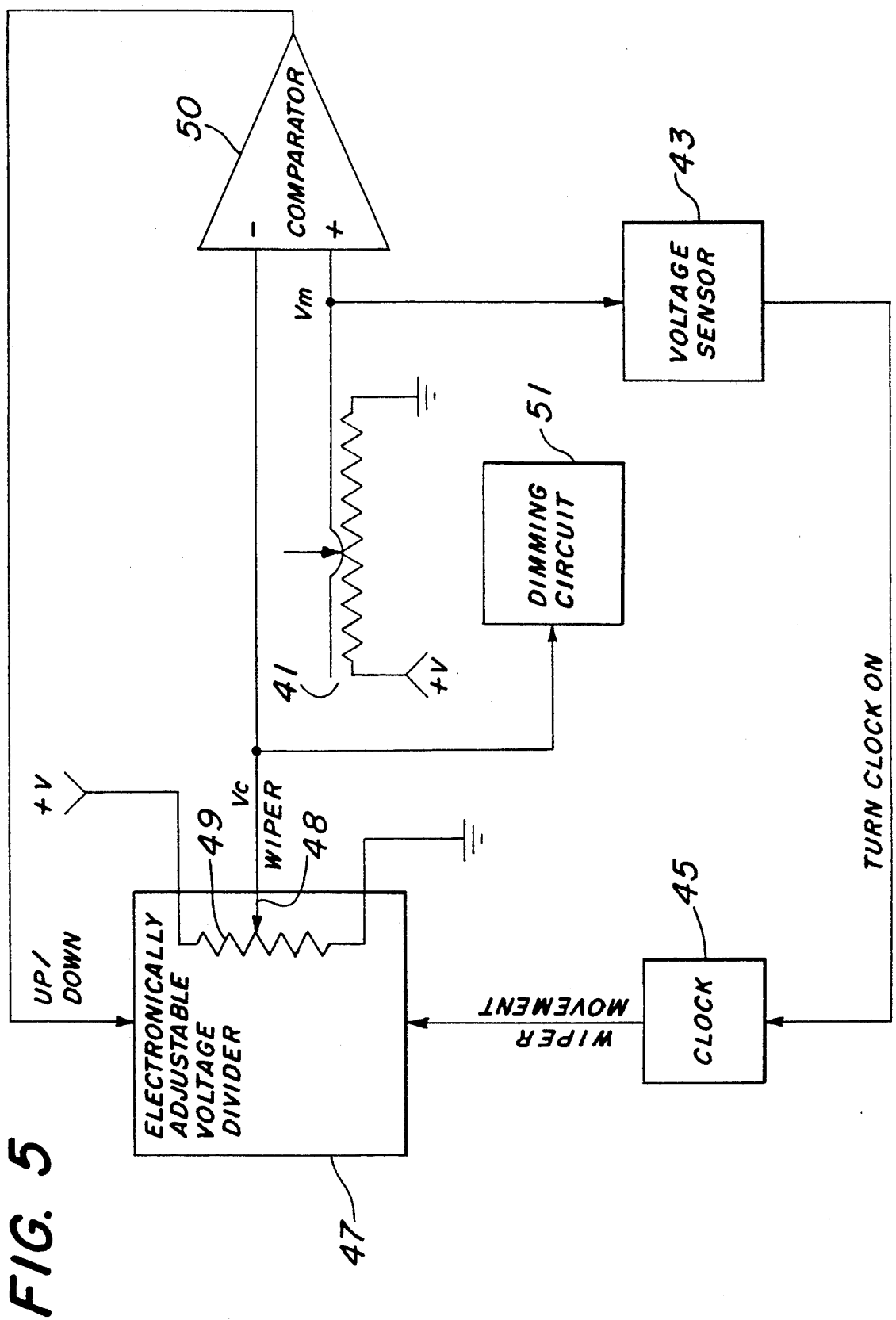
FIG. 5 is a block diagram of a control circuit of the present invention.

FIG. 5 is a block diagram of a preferred control circuit of the present invention for controlling a conventional phase-control dimming circuit in response to a momentary voltage from a membrane voltage divider. Pressure is initially applied to a selectable point along membrane voltage divider 41 to provide a momentary voltage $V_m$ that corresponds to a desired power level. Voltage sensor 43 detects this voltage and turns on clock 45. Clock 45 provides periodic enabling pulses to the wiper movement control pin of IC 47, preferably an electronically adjustable voltage divider (EAVD), which incrementally moves wiper 48 along resistive element 49. Wiper 48 divides a voltage across resistance element 49 according to its position and provides a corresponding continuous voltage $V_c$. Comparator 50 compares momentary voltage $V_m$ with continuous voltage $V_c$ and provides an output to the up/down pin of EAVD 47 which, on the next enabling pulse, causes the wiper to move up if $V_m$ is greater than $V_c$ and down if the opposite condition is true. In this manner, $V_c$ quickly approaches $V_m$. When pressure on voltage divider 41 is released, voltage is removed from voltage sensor 43 turning clock 45 off. Clock 45 stops providing enabling pulses to the wiper movement control pin of EAVD 47 and wiper 48 does not move. $V_c$ is provided to dimming circuit 51, which determines the power provided to a load accordingly. Dimming circuit 51 may be a conventional phase-control circuit or any other suitable power control circuit. Although wiper 48 has been described as moving up or down along resistive element 49, to provide a varying voltage $V_c$, the same function is preferably accomplished by selectively controlling a series of electronic switches or the like.

Figure 6:
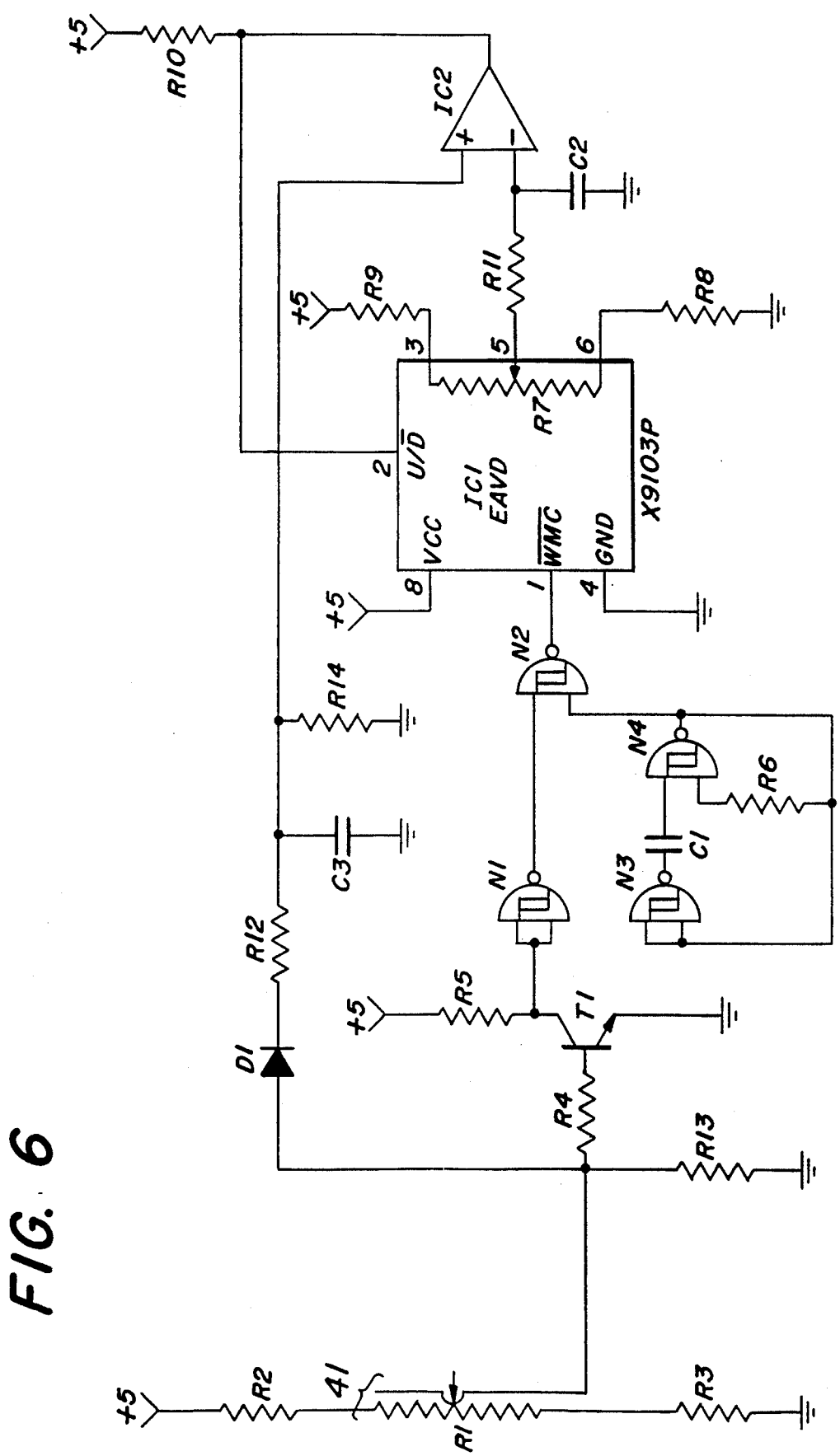
FIG. 6 is a circuit schematic of the control circuit of FIG. 5.

FIG. 6 is a circuit schematic of the control circuit of FIG. 5. Resistive element R1 of membrane voltage divider 41 is connected in series with resistors R2 and R3. A DC voltage (preferably 5 V) is applied across the series combination providing a predetermined voltage gradient along the surface of resistive element R1. Resistors R2 and R3 are selected to limit, respectively, the high and low end values of the voltage on R1.

The circuit operates as follows: Pressure applied to membrane voltage divider 41 causes contact at a point along resistive element R1 to selectively provide a momentary voltage $V_m$, selectable from a continuous range of voltages. Current flows through resistor R4 and the base-emitter junction of transistor T1, turning it on. The collector voltage of transistor T1 drops, allowing current to flow through resistor R5 and pulling the inputs of Schmidttriggered NAND gate N1 low. NAND gate N1 provides a high bit to one input of NAND gate N2, the other input being provided by an oscillating circuit comprising NAND gates N3 and N4, resistor R6, and capacitor C1. Resistor R6 and capacitor C1 are preferably selected to provide an oscillating frequency of approximately 1000 Hz. The output of NAND gate N2 inversely follows the output of NAND gate N4, providing an oscillating input to the wiper movement control pin 1 of EAVD IC1, which is preferably a Xicor E²POT digitally controlled potentiometer model number X9103P. See, for example, Xicor Data Book, Section 4, incorporated herein by reference.

The E²POT includes resistor array R7, which comprises 99 resistive elements connected between pins 3 and 6. Between the elements, and at either end, are accessible tap points that are electrically connectable to wiper pin 5. An oscillating input to wiper movement control pin 1 has the effect of moving wiper pin 5 up or down along resistor array R7 in response to a high or low bit input on up/down pin 2, respectively. A continuous DC voltage provided across resistor array R7 is divided between resistive elements on either side of wiper pin 5, providing a corresponding continuous voltage output $V_c$, selectable from an essentially continuous range of voltages. Resistors R8 and R9 determine the range of voltages that are selectable along resistor array R7. The range voltages along R7 is preferably, but not necessarily, equal to the range of voltages along R1.

Comparator IC2 receives momentary voltage $V_m$ and continuous voltage $V_c$ and provides a single bit digital output to up/down pin 2 corresponding to their difference. Preferably, IC2 is an open collector output device, R10 being the pull-up resistor. The characteristics of the circuit are such that continuous voltage $V_c$ quickly (<100 ms) converges to the value of momentary voltage $V_m$. $V_c$ may alternatively converge to a value that is proportional to or otherwise functionally related to $V_m$. Resistor R11 and capacitor C2 filter the output voltage $V_c$ of pin 5; similarly, resistor R12 and capacitor C3 filter the output voltage $V_m$ of voltage divider 41, in order to prevent unstable operation of comparator IC2.

When pressure is removed from voltage divider 41, $V_m$ goes to zero. Resistor R13 ties the base of transistor T1 to ground, turning if off. Diode D1 prevents voltage stored on capacitor C3 from turning transistor T1 back on. Resistor R14 provides a discharge path to ground for capacitor C3. The collector voltage of transistor T1 drives the inputs of NAND gate N1 high. The output of NAND gate N1, which is provided to one input of NAND gate N2, goes low, thus holding the output of NAND gate N2 high regardless of its second input. A continuous high bit is provided to wiper movement control pin 1, which prevents any change of the wiper position and, thus, maintains $V_c$ at a constant value. $V_c$ is provided to a conventional phase-control dimming circuit of the type disclosed in U.S. Pat. No. 4,575,660, issued Mar. 11, 1986, to Zaharchuk, et al., incorporated herein by reference, which controls power to a load accordingly.

EAVD IC1 preferably includes a non-volatile memory, in which wiper positions may be stored without requiring power. In that case, after a power source interruption, power to the load can be restored to a level set prior to the interruption. Alternatively, a battery backup RAM or any other device that does not require continuous power from the source may store power level information. The wiper position may be stored after each adjustment or, preferably, only when a power interruption is detected by a voltage differentiating circuit. A similar type of power recovery circuit can be used for any type of touch operated control system.

Figure 7:
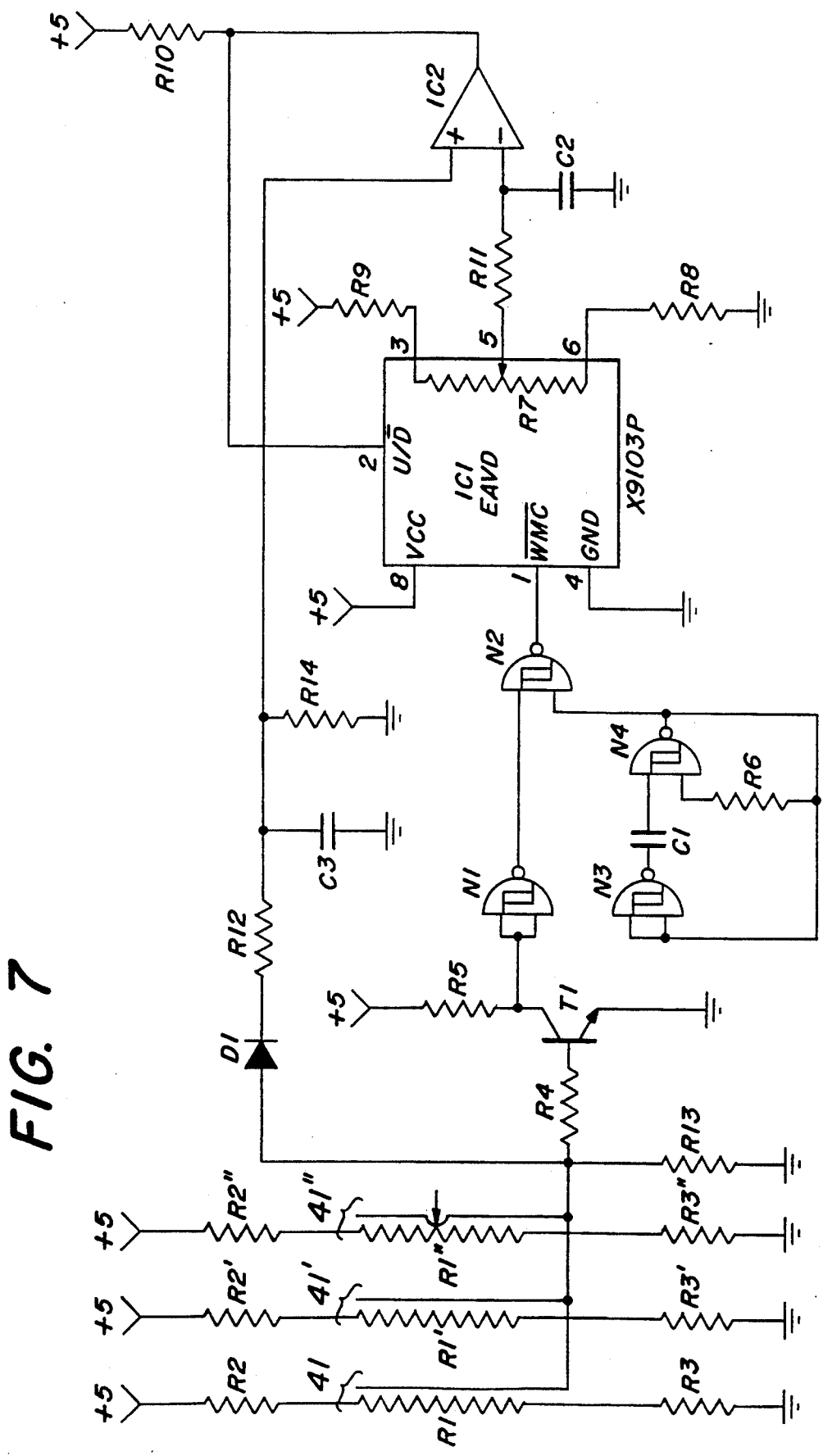
FIG. 7 is a circuit schematic of a multi-location control circuit of the present invention.

FIG. 7 is a circuit schematic of a multi-location control circuit of the present invention. Beyond the circuit of FIG. 6, additional touch-operable voltage divider 41' and 41" are provided to control power to load from multiple locations. The circuit functions substantially the same as the circuit of FIG. 6, except that each voltage divider is operable to provided a momentary voltage $V_m$, the most recent of which determines the magnitude of wiper voltage $V_c$. Selectively touching any one of the touch-operable voltage dividers substantially instantaneously adjusts the power level in accordance with the momentary voltage produced. Each voltge divider is preferably operable to produce an equivalent range of momentary voltages; however, this is not a necessary condition. Each voltage divider is preferably mounted behind a cover plate, as shown in FIGS. 3 and 4, and is electrically connectable to the control circuit described above. Alternatively, one or more voltage dividers may be incorporated into a hand-held wireless remote control, such as an infrared control. LED indicators at each location may optionally provide a visual indication of the power level.

Since certain changes may be made to the control system described above without departing from the scope of the invention herein described, it is intended that all matter contained in the above description or shown in the accompanying drawings shall be interpreted in an illustrative and not a limiting sense.

We claim:

1. A system for controlling power from a source to a load, comprising, in combination:
   (a) a cover plate that has a front surface, an area of which is flexible,
   (b) touch-operable means behind said flexible area having a continuous surface for providing a signal in response to pressure applied anywhere along said flexible area, the signal having at least one characteristic which is a function of the actual location on the flexible area to which said pressure is applied, said touch-operable means comprising first and second electrically conductive elements juxtaposed substantially coexistensively between substrates, at least one of which is flexible, and separated by a small gap, wherein said first electrically conductive element is operable to provide a voltage gradient along its surface, a point along which is electrically connectable to a corresponding point along said second electrically conductive element to selectively provide a voltage to a terminal thereof, and
   (c) circuit means to determine the power provided from said source to said load in accordance with said signal.

2. A system for controlling power from a source to a load, comprising, in combination:
   (a) a cover plate that has a front surface, an area of which is flexible,
   (b) touch-operable means behind said flexible area having a continuous surface for providing a signal in response to pressure applied anywhere along said flexible area, the signal having at least one characteristic which is a function of the actual location on the flexible area to which said pressure is applied, and
   (c) circuit means to determine the power provided from said source to said load in accordance with said signal, wherein said circuit means comprises an electronically adjustable voltage dividing means.

3. A system for controlling power from a source to a load, comprising, in combination:
   (a) flexible means having a continuous surface for providing a momentary voltage selectable from a continuous range of voltages developed in response to pressure applied anywhere along said flexible area,
   (b) electronically adjustable voltage dividing means for providing a continuous output voltage selectable from a range of voltages,
   (c) comparator means to compare said momentary and continuous voltages and generating from the comparison an up-down signal having a voltage value dependent on the relative magnitudes of said momentary and continuous voltages, and operably connected to the electronically adjustable voltage dividing means for adjusting said electronically adjustable voltage dividing means,
   (d) the electronically adjustable voltage dividing means further including a first input terminal for accepting electronic pulses, and a second input terminal for accepting the up-down signal, whereby the output voltage is incrementally increased upon each pulse entered into the first input terminal when the up-down signal is within a first preselected range of voltages, and whereby the output voltage is incrementally decreased with each pulse input to the first input terminal when the up-down signal is within a second preselected range of voltages, and (e) circuit means to determines the power provided from said source to said load in accordance with said continuous voltage.

4. The control system of claim 3 wherein said means for providing a momentary voltage further includes touch-operable means having first and second electrically conductive elements juxtaposed substantially coextensively and having a space therebetween, said elements being disposed between substrates, at least one of said substrates being flexible.

5. The control system of claim 3 further comprising pulsing means, operably connected to the first input terminal of said electronically adjustable voltage dividing means, to provide pulses thereto.

6. The control system of claim 5 further comprising sensing means responsive to said momentary voltage to activate said pulses means.

7. The control system of claim 3 wherein said electronically adjustable voltage dividing means further includes means, requiring no power, for storing the value of the continuous voltage upon a cutoff in power to the system.

8. The control system of claim 3 wherein said circuit means comprises a phase-control circuit for controlling the power provided from said source to said load.

9. The control system of claim 3 wherein said circuit means is operable, in accordance with said continuous voltage, to provide a level of power selectable from a substantially continuous range of levels, from said source to said load.

10. The control system of claim 3 further comprising additional touch-operable means, operable to adjust the power provided to said load.

11. The control system of claim 3 further comprising visible means for indicating the level of power provided to said load.

12. A multi-location system for controlling power from a source to a load, comprising, in combination:
(a) a plurality of touch operable means positionable at a plurality of locations with each touch operable means having flexible means, each of said flexible means having a continuous surface for providing a signal in response to pressure applied anywhere along said continuous surface, said signal of said touch operable means being a momentary voltage selectable from a range of voltages,
(b) means for storing information representative of the most recent momentary voltage from one of the touch operable means and for providing a continuous output voltage corresponding to said most recent momentary voltage, said means including a first input terminal for accepting electronic pulses, and a second input terminal for accepting an up-down signal, whereby the output voltage is incrementally increased upon each pulse entered into the first input terminal when the input to the second input terminal is within a first preselected range of values and whereby the output voltage is incrementally decreased with each pulse entered into the first input terminal when the input to the second input terminal is within a second preselected range of values, and
(c) circuit means to determine the power delivered from said source to said load in accordance with said continuous voltage, said circuit means including comparator means for comparing said momentary and continuous voltages, thereby creating an up-down signal having a voltage value dependent on the relative magnitudes of said momentary and continuous voltages, and operably connected to the second input terminal of the means for storing information representative of said momentary voltage.

13. The control system of claim 12 wherein said means to provide a momentary voltage comprises first and second electrically conductive elements juxtaposed substantially coextensively between substrates, at least one of said substrates being flexible, and said first and second elements being separated by a small gap.

14. The control system of claim 13 wherein said first electrically conductive element is operable to provide a voltage gradient along its surface, a point along which is electrically connectable to a corresponding point along said second electrically conductive element to selectively provide a voltage to a terminal thereof.

15. The control system of claim 12 wherein said storage means comprises an electrically adjustable voltage dividing means.

16. The control system of claim 15 wherein said electronically adjustable voltage dividing means stores without requiring power the most recent value of the continuous voltage.

17. The control system of claim 12 wherein said circuit means comprises a phase-control circuit for controlling the power provided from said source to said load.

18. The control system of claim 12 wherein said circuit means is operable to alternately turn power to said load on and off in response to said momentary voltage.

19. The control system of claim 12 further comprising visible means for indicating the level of power provided to said load.

20. The control system of claim 3, wherein said means for providing a momentary voltage includes touch-operable means including a cover plate having a flexible area, the flexible area comprising a thin web of material having a front surface that is substantially continuous with the remainder of said front surface of said cover plate and a back surface that is recessed from a back surface of said cover plate.

21. The control system of claim 20 wherein said front surfaces of said flexible area and said cover plate are substantially planar.

22. The control system of claim 21 wherein said cover plate front surface is marked to define the location of said flexible area.

23. The control system of claim 4 wherein said first electrically conductive element is operable to provide a voltage gradient along its surface, points along which are electrically connectable to corresponding points along said second electrically conductive element to selectively provide a voltage to a terminal thereof.

24. The control system of claim 20 wherein said touch-operable means and said circuit means are connectable via a removably-attachable plug and socket means.

25. The control system of claim 4 wherein said touch-operable means is substantially elongated in shape.

26. The control system of claim 4 wherein said touch-operable means is supported behind said flexible area by a substantially rigid plate which is attached to the back of said cover plate.

27. The control system of claim 26 wherein said substantially rigid plate provides a water-tight seal with the back of said cover plate.

28. The control system of claim 4 wherein said circuit means is operable to turn power to said load on and off in response to pressure applied to said touch operable means.

29. The control system of claim 3 wherein said circuit means is operable to provide a level of power, selectable from a substantially continuous range of levels, from said source to said load.

30. The control system of claim 3 further comprising an additional means for providing a momentary voltage, operable to adjust the power provided to said load.

31. The control system of claim 3 further comprising visible means for indicating the level of power provided to said load.

32. The control system of claim 31 wherein said cover plate further comprises a light transmissive area through which said indicating means is visible.

33. A system for controlling power from a source to a load, comprising, in combination:
 (a) touch-operable means including a flexible area having a continuous surface for providing a signal in response to an applied pressure anywhere along the flexible area, the signal having at least one characteristic which is a function of the actual location on the flexible area to which said pressure is applied, said touch-operable means comprising first and second electrically conductive elements juxtaposed substantially coextensively between substrates, at least one of which is flexible, and separated by a small gap, wherein said first electrically conductive element is operable to provide a voltage gradient along its surface, a point along which is electrically connectable to a corresponding point along said second electrically conductive element to selectively provide a voltage to a terminal thereof,
 (b) means, requiring no power, for storing information representative of said signal, and
 (c) circuit means to determine the power provided from said source to said load in accordance with said signal.

34. A system for controlling power from a source to a load, comprising, in combination:
 (a) touch operable means including a flexible area having a continuous surface for providing a signal in response to an applied pressure anywhere along the flexible area, the signal having at least one characteristic which is a function of the actual location on the flexible area to which said pressure is applied,
 (b) means, requiring no power, for storing information representative of said signal, wherein said storage means comprises an electronically adjustable voltage dividing means, and
 (c) circuit means to determine the power provided from said source to said load in accordance with said signal.

* * * * *